C. I. McCREERY.
CORN TURNER.
APPLICATION FILED SEPT. 11, 1909.
975,265.
Patented Nov. 8, 1910.
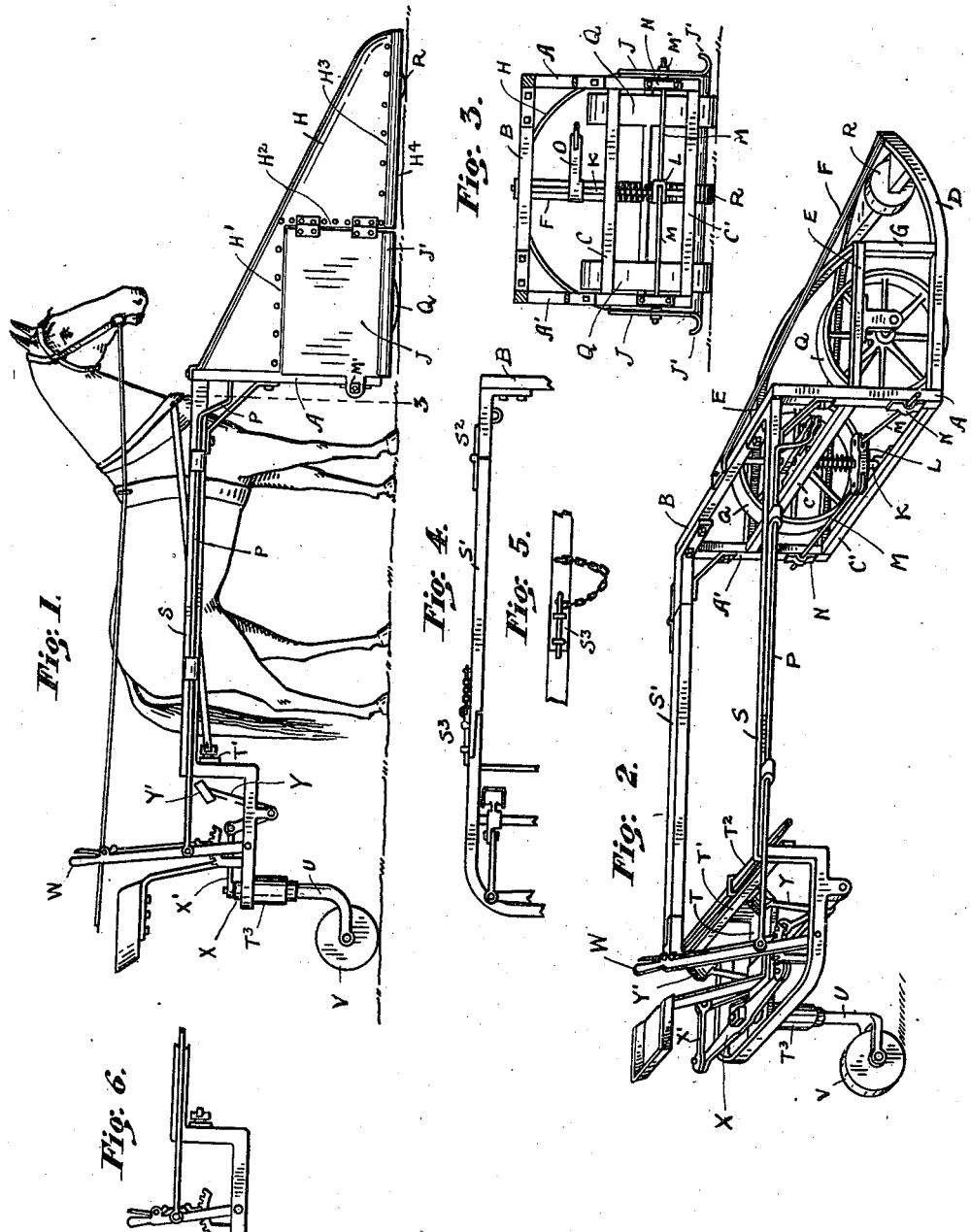
WITNESSES:
INVENTOR
CLAYTON I. McCREERY.
BY
ATTORNEY

UNITED STATES PATENT OFFICE.

CLAYTON I. McCREERY, OF MUNCIE, INDIANA.

CORN-TURNER.

975,265.  Specification of Letters Patent.  Patented Nov. 8, 1910.

Application filed September 11, 1909. Serial No. 517,226.

*To all whom it may concern:*

Be it known that I, CLAYTON I. MCCREERY, a citizen of the United States, and a resident of the city of Muncie, in the county of Delaware and State of Indiana, have invented a new and useful Corn-Turner.

This invention relates to improvements in agricultural implements and has for its objects to provide an implement for the spreading or turning of corn stalks in the field.

In the farming of wheat it is the general practice to drill or plant the wheat in the fall season and while the corn is still standing. To the end that this drilling or planting may be accomplished it is necessary for the corn stalks to be moved apart and the way cleared for the subsequent passing of the wheat drill or planter. This task of turning the corn stalks is difficult and arduous and the employment of additional farm hands is frequently necessary at a time when labor is otherwise employed.

To overcome the foregoing difficulties and to accomplish the turning of the corn stalks rapidly, are the main objects of this invention.

Further objects are to provide a machine for this purpose which will be capable of being propelled by a horse, and which machine will be strong and durable, not liable to get out of repair and which may be easily manipulated.

The objects of my invention are accomplished by the new combination, construction and arrangement of parts described in this specification, defined in the appended claims and illustrated in the accompanying drawings, in which—

Figure 1 is a side view, and Fig. 2 is a perspective view of my invention. Fig. 3 is a transverse sectional view taken on the line 3 Fig. 1. Fig. 4 is a detached plan view of the side shaft $S^1$. Fig. 5 is a reverse side view of a portion of the side shaft $S^1$. Fig. 6 is a modified form of construction and arrangement of the rear portions of the side shafts.

The spreader-body frame of my improved implement comprises the uprights A $A^1$ and the cross pieces B and C and $C^1$. Extending forwardly from the uprights A and $A^1$ are the lower girts D and the upper girts E. The forward ends of these girts D and E are brought together and secured to the center bar F, the lower girts being extended forwardly of the upper girts. At the spring of the curve in these girts are arranged the uprights G. This frame structure has a sheet cover H made of light sheet metal or plate the edges $H^1$ being secured to the upper girt and the edges $H^2$ and the lower portion $H^3$ being secured to the upright G and the forward portion of the girt D, respectively. The bottom edges $H^4$ are curled so that in the contact of the said plate with the stalks there will be no cutting or mutilation of the latter. The rear portions of the cover of this spreader-body consist of the spreader plates J. These spreader plates have their forward edges hingedly secured to the uprights G and the lower edges $J^1$ are curled to correspond to the curled lower edges of the cover plate H. The spreader body thus described should be of such width that it may easily pass between the corn rows. I render this spreader body capable of enlargement in width by providing the said hingedly arranged spreader plates J and means to expand same.

Loosely sustained in suitable bearings carried by the cross pieces C and $C^1$ is the upright bar K. To the ends of the arm L which is secured to said upright bar, are loosely secured the inner ends of the reach rods M. The outer portions of these reach rods work loosely in the bearings N and the ends are threaded and will be held in engagement with the spreader plates by the nuts $M^1$. A strong coil spring carried by the upright bar K and which has its ends connected to the arm L and the cross piece $C^1$ will operate to normally retain the spreader plates in the retracted position against the spreader body frame.

To the free end of the arm O that is secured to the upright bar K, is loosely connected the control rod P. This control rod extends rearwardly and by its operation the positions of the spreader plates with reference to the spreader body frame, may be varied. This spreader body will be of free movement on the ground being supported on the wheels Q and the roller R, all of which are of suitably wide tread.

By the foregoing construction I provide a spreader body which when moved forwardly between the rows of corn will readily turn aside the stalks. The interior parts of the device will be housed and protected, the stalks will not be mutilated, and the horse which will be attached to propel the spreader body, will be shielded from all contact with the stalks operated against by the machine. The horse will work between the side-shafts S and S¹ which are securely fastened to the uprights A and A¹. The rear portions of these side shafts are terminated in a structure upon which the operative may ride, and which structure will be capable of free movement over the ground. The preferred form of structure and arrangement of the parts of this portion of my invention is that shown in the drawings. The rear portions of the said side-shafts are bent downwardly and thence toward each other and are joined securely together by the center plate T. This center plate forms a central frame member; it is bent upwardly at its front end and is then secured to the stay plate T¹ the ends of which stay plate are secured to the side-shafts S and S¹. The function of the swingletree T² is obvious. Upon the underside and to the rear portion of said center plate is provided the head T³. Pivotally retained in this head is a head shaft U; its lower portion is curved rearwardly and between the fork ends of same is the wheel V. This wheel supports rotatably the said structure and also will act as a guide-wheel, as will hereinafter be referred to. Rising from the said center plate T is a suitable spring bar upon which the operator's seat is supported. W designates a control lever pivotally connected on the said structure and adjacent the seat of the operator. This control lever has loose connection with the rear end of the control rod P, and by suitable means such as the well known toothed sector and a hand-operated detent to engage same, may be moved to and held in different positions. By moving the control lever forwardly the spreader plates J will be expanded and the spreader body will accordingly be widened.

To the end that the correct direction of movement forwardly of the spreader body may be accomplished, I have provided means whereby the operator may with his feet direct the movement of the wheel V.

Secured to the upper end of the head shaft U is the cross arm X. Foot levers Y provided with foot rests Y¹ are carried loosely on a suitable transverse shaft supported by the side-shafts S S¹, and by the connecting rods X¹ which form loose connections between the said foot levers and the ends of the cross-arm X, the movement of the head shaft U rotatively, may be controlled. The side shaft S¹ is provided with the hinge connection S², toward its forward end, and at the rear portion the said side shaft is divided and has a suitable locking means S³.

My invention complete appears as shown in Fig. 1. The horse will be placed in position between the side-shafts, and the side-shaft S¹ locked into closed position. No harness attachments are necessary except the tug connections from the hames to the swingletree T², and transverse straps having connections with the horse's harness, and the side-shafts, to keep the horse at substantially central position between the side shafts. The several parts of my invention are so composed, combined and arranged with reference to each other and to the horse that with the progress of the horse, the spreader body will be moved forwardly over broken or rough ground, steadily, and without tendency to be deflected out of its directed line of travel. The width of the spreader body may be varied to accord to the width of the corn row, by the operator manipulating the control lever W. The operator's feet will be disposed in the foot rests Y¹ and by slight movement of the foot lever Y the wheel V will be directed one way or the other and the spreader body will be guided in its movement forwardly in much the same manner as a ship is guided by its rudder.

In Fig. 6 is seen a modified form of side-shafts. In this form of carrying my invention into effect it is contemplated that the operator will handle the control lever and guide the device from his walking position between the handles provided at the rear ends of the side shafts.

I am aware that minor changes may be made in the details and in the combination and arrangement of the parts of my invention, within the scope of the appended claims without departing from the nature or spirit of my invention and without sacrificing any of its advantages.

What I claim as my invention and desire to secure by Letters Patent of the United States, is—

1. In an implement of the kind described, the combination of a spreader-body capable of being moved over the ground, spreader plates carried by the spreader-body and capable of being expanded to increase the width of the spreader-body, an upright rock-shaft disposed between the said spreader-plates and having a cross-arm, reach rods to connect the said spreader plates and the cross-arm, said shafts having their forward ends secured to the said spreader-body and between which said side shafts a horse may work, a control lever carried on one of said side shafts, connections between the control lever and the rock-shaft.

2. In an implement of the kind described, the combination of a spreader-body capable of being moved over the ground, spreader-plates carried by the spreader-body and capable of being expanded to increase the width of the spreader-body, an upright rock shaft disposed between the said spreader-plates and having a cross arm, reach rods to connect the said spreader plates and the cross arm, side shafts having their forward ends secured to the said spreader body and between which said side shafts a horse may work, the rear portions of said shafts being bent downwardly thence toward each other and formed into a frame, a rudder wheel upon which said frame is supported, a control lever carried by the said frame, connections between the control lever and the said rock shaft.

3. In an implement of the kind described, a triangular shaped frame having a bogie wheel at its forward end, a pair of wheels to support said frame at its rear portion, spreader-plates hingedly connected to the sides of said frame, an upright rock-shaft carried by the frame and having a cross arm, reach rods to connect the said spreader-plates and the cross-arm, side shafts having their forward ends secured to the said frame one of said side shafts having a hinge and lock connection to permit of the entry of a horse between the side shafts, and said side shafts being brought together at their rearward ends and formed into a frame, a rudder wheel upon which said frame is supported, a foot lever carried by the frame, connections between the foot lever and the rudder wheel, a control lever carried by the frame, connections between the control lever and the aforesaid rock-shaft.

In testimony whereof I have signed my name to this specification in the presence of two subscribing witnesses.

CLAYTON I. McCREERY.

Witnesses:
   HERSCHEL M. RIGGIN,
   ETHEL L. LISTER.